United States Patent
Schaible

(10) Patent No.: US 11,929,682 B2
(45) Date of Patent: Mar. 12, 2024

(54) ZVS ASSIST SNUBBER FOR SWITCHING CONVERTER

(71) Applicant: AES Global Holdings PTE Ltd., Singapore (SG)

(72) Inventor: Todd Martin Schaible, Orono, MN (US)

(73) Assignee: AES Global Holdings PTE Ltd., Singapore (SG)

(*) Notice: Subject to any disclaimer, the term of this patent is extended or adjusted under 35 U.S.C. 154(b) by 30 days.

(21) Appl. No.: 17/660,708

(22) Filed: Apr. 26, 2022

(65) Prior Publication Data
US 2023/0344354 A1 Oct. 26, 2023

(51) Int. Cl.
*H02M 3/335* (2006.01)
*H02M 1/34* (2007.01)
*H02M 1/00* (2006.01)

(52) U.S. Cl.
CPC ........... *H02M 3/335* (2013.01); *H02M 1/346* (2021.05); *H02M 1/0058* (2021.05)

(58) Field of Classification Search
CPC ......... H02M 1/0058; H02M 1/34–348; H02M 3/335–33523; H02M 3/33569
See application file for complete search history.

(56) References Cited

U.S. PATENT DOCUMENTS

| | | | | |
|---|---|---|---|---|
| 2019/0013739 | A1* | 1/2019 | Hari | H02M 3/33569 |
| 2019/0181817 | A1* | 6/2019 | Al-Shyoukh | H02M 7/797 |
| 2020/0099255 | A1* | 3/2020 | Al-Shyoukh | H02M 3/3374 |
| 2022/0393597 | A1* | 12/2022 | Shanthosh | H02M 3/33507 |

FOREIGN PATENT DOCUMENTS

EP 1003272 A2 5/2000

* cited by examiner

*Primary Examiner* — Fred E Finch, III

(57) ABSTRACT

A voltage converter comprising a voltage input, a transformer comprising a primary winding coupled with the voltage input, a main switch coupled at a node with the primary winding, a snubber circuit coupled with the voltage input and with the node, the snubber circuit comprising a controllable switch having a gate and a source. A control circuit is coupled with the main switch and configured to turn the main switch on and off to convert an input voltage supplied to the voltage input to an output voltage distinct from the input voltage. The gate is coupled with the source to prevent the controllable switch from turning on.

18 Claims, 5 Drawing Sheets

ZVS ASSIST SNUBBER FOR SWITCHING CONVERTER

TECHNICAL FIELD

Aspects of the disclosure relate to output power distribution, and more particularly to a switching converter with a snubber.

BACKGROUND

A voltage converter is a power converter where an input DC voltage is increased or decreased to a desired DC voltage level at the converter's output. One example of a typical prior art voltage converter 100 (shown as a flyback converter topology) is illustrated in FIG. 1. Voltage converter 100 has an input terminal 101 for enabling an input voltage Vin to be coupled with the voltage converter 100. The voltage converter 100 includes a transformer 102 with a primary winding 103 coupled with the input terminal 101 and a controllable switch 104. The switch 104 is typically a metal-oxide-semiconductor field-effect transistor (MOSFET) having a control input, a drain, and a source terminal. A control circuit (not shown) is coupled to the control input for providing a control signal for controlling the timing of the on and off transition of the switch 104. The control circuit typically includes a pulse width modulation circuit (PWM). In operation, when the switch 104 is on, the inductor current in the primary winding 103 increases, storing energy in its magnetic field. When the transistor switch 104 is off, this energy is transferred via the secondary winding 105 of the transformer 102 to the output capacitor 106 and the load (not shown). Drawbacks of such conventional voltage converter circuits include the creation of switch voltage and current stresses, which result in low efficiency power conversion.

Accordingly, a snubber or clamp circuit 107 including a snubber diode 108 in series with a snubber capacitor 109 is added to the voltage converter 100. The snubber circuit 107 may also include a snubber resistor (not shown) coupled in parallel with the snubber capacitor 109 and may be also known as an RCD clamp. The snubber circuit 107 is designed to suppress the spike generated at the drain of MOSFET 104 caused by the large current pulse and the leakage (parasitic) inductance in the circuit when MOSFET 107 is turned off.

Referring to FIGS. 2-4, equivalent circuits during periods t0-t2 (FIG. 2) and periods t2-t4 (FIG. 3) are illustrated for a timing diagram of periods t0-t4 (FIG. 4) for the voltage converter 100 of FIG. 1. The equivalent circuit 200 illustrated in FIG. 2 shows parasitic capacitances that include an equivalent capacitor 201 connected from a node 202 coupling the switch 104 to the primary winding 103. In addition, parasitic capacitance indicated by a diode capacitor 203 is illustrated in parallel with the snubber diode 108. Referring to FIG. 4, the switch 104 is turned on at the beginning of the time interval t0-t1. Accordingly, Vin is applied across the primary winding 103, and the primary current Ipri through the primary winding 103 linearly increases while the switch 104 is turned on. In addition, the snubber diode 108 is reverse biased. At t1, the switch 104 is turned off, and the energy stored in the current through the magnetizing inductance and leakage inductance push up the drain voltage Vds of the switch 104 and charge all the associated node capacitances until D1 and D2 become forward biased. C1 is large enough to capture the energy associated with the leakage inductance and control the peak voltage on the switch 104. The snubber resistor may be used to remove the charge from C1 each cycle unless the parasitic C2 is used. In response to the primary current Ipri reaching 0 A, the voltage on the primary is the reflected voltage of the secondary across the transformer per the primary-to-secondary turns ratio n. This reflected voltage is maintained until the secondary current Isec reaches 0 A and the transformer 102 is discharged at t2.

Referring to FIGS. 3 and 4, at t2, the drain of Q1 node capacitance (Ceq) is charged to Vin+Vrefl, which places reflected voltage Vrefl across the primary inductance L1. This node capacitance and the primary inductance L1 form a natural resonance LC tank. Natural resonance with linear parts limits the voltage swing to the initial condition. That is, the node capacitance only discharges to Vin-Vrefl. It is noted that at t2, the resonant tank has 0 A, no magnetic energy, and maximum voltage all electric field energy. At t3, the resonant tank has maximum magnetic energy and 0 electric field energy (VL1=0, effectively). At t4, the resonant tank has 0 A, no magnetic energy and maximum electric field energy. The point t4 is the point quasi-resonant controllers will turn Q1 on, at the minimum drain voltage to reduce switching loss. Turning on the switch Q1 at or near a minimum of the first ringing valley as is done in the quasi-resonant mode control attempts to turn on the switch 104 at a lowest voltage available during the ringing, but even at the minimum voltage occurring at the first valley, a significant voltage 400 is still experienced by the switch 104 sufficient to produce inefficiencies in voltage conversion, spurious EMI, and the like compared with zero voltage switching (ZVS).

FIG. 5 illustrates an example of a timing diagram showing the drain-source voltage of the switch 104 and the primary current waveform at various points for the flyback converter of FIG. 1 with switch turn-on occurring during the second valley.

A need, therefore, exists for a snubber circuit and power converter topology that solves the above-described drawbacks to provide increased efficiency by reducing conduction losses.

SUMMARY

In accordance with one aspect of the present disclosure, a voltage converter comprising a voltage input, a transformer comprising a primary winding coupled with the voltage input, a main switch coupled at a node with the primary winding, a snubber circuit coupled with the voltage input and with the node, the snubber circuit comprising a controllable switch having a gate and a source. A control circuit is coupled with the main switch and configured to turn the main switch on and off to convert an input voltage supplied to the voltage input to an output voltage distinct from the input voltage. The gate is coupled with the source to prevent the controllable switch from turning on.

In accordance with another aspect of the present disclosure, a method of manufacturing a voltage converter comprising coupling a transformer comprising a primary winding coupled with a voltage input, coupling a main switch with the primary winding at a node, and coupling a snubber circuit with the voltage input and with the node. The snubber circuit comprises a controllable switch having a gate and a source. The method also includes coupling a control circuit coupled with the main switch and configuring the voltage input to turn the main switch on and off to convert an input voltage supplied to the voltage input to an output voltage distinct from the input voltage. The gate is coupled with the source to prevent the controllable switch from turning on.

BRIEF DESCRIPTION OF THE DRAWINGS

The drawings illustrate embodiments presently contemplated for carrying out the invention.

In the drawings.

Figure 1:
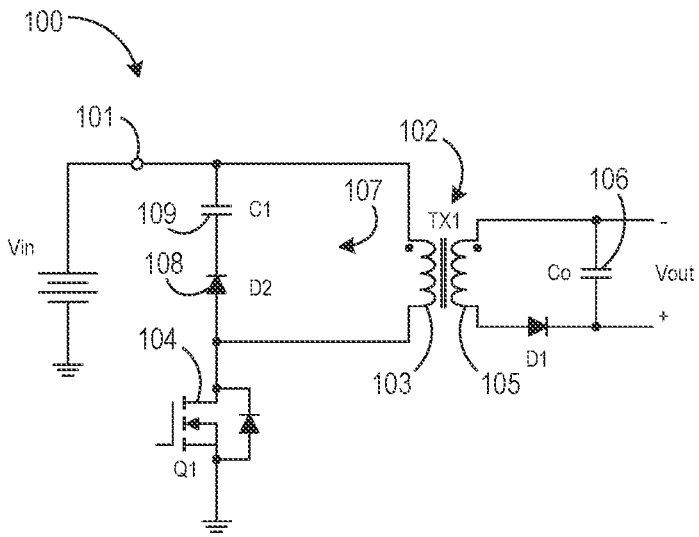
FIG. 1 is a schematic diagram of a DC/DC flyback voltage converter known in the art.
Figure 2:
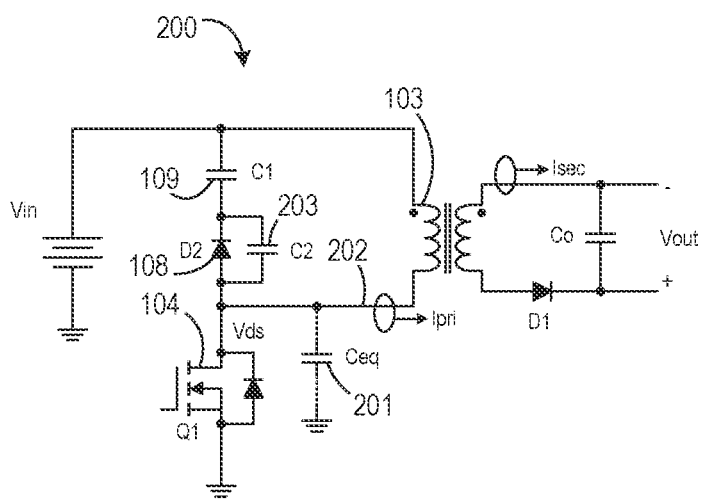
FIG. 2 is an equivalent schematic diagram of the flyback converter of FIG. 1.
Figure 3:
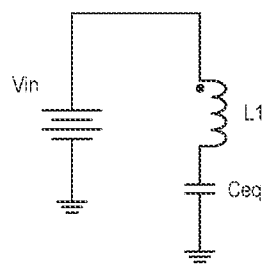
FIG. 3 is an equivalent schematic diagram during a portion of an operational cycle of the flyback converter of FIG. 1.
Figure 4:
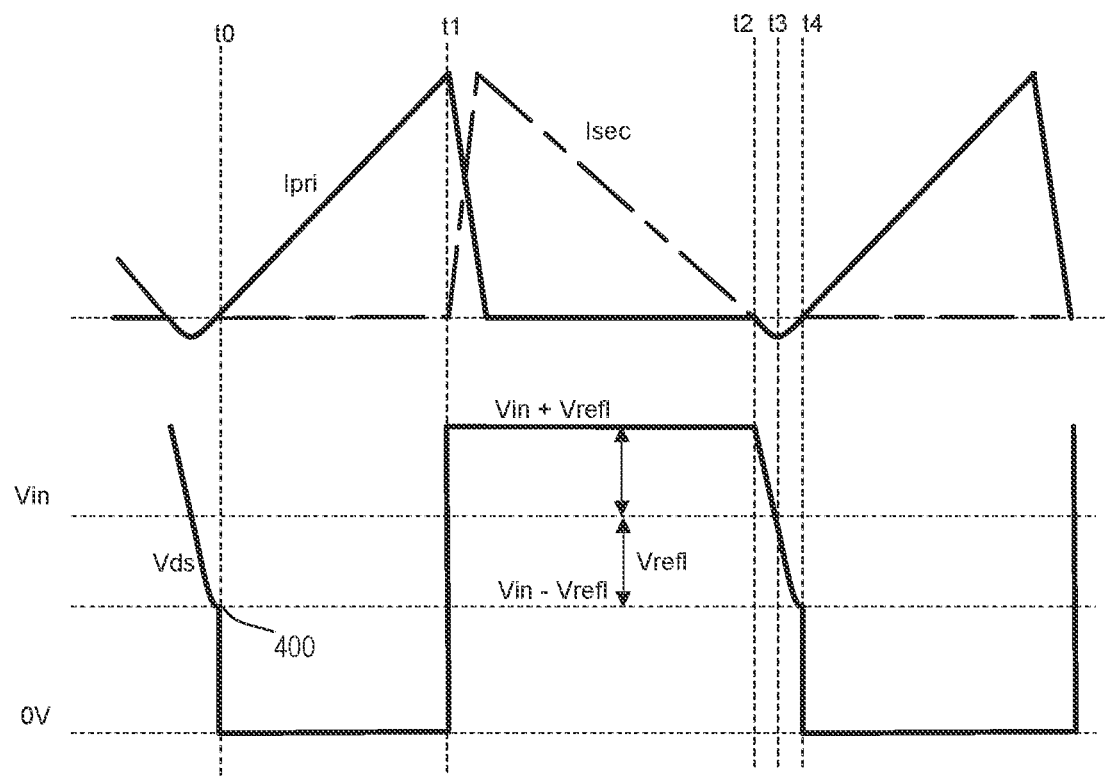
FIG. 4 is a timing diagram that illustrates voltage and current waveforms at various points for the flyback converter of FIG. 1 during an operational cycle according to an example.
Figure 5:
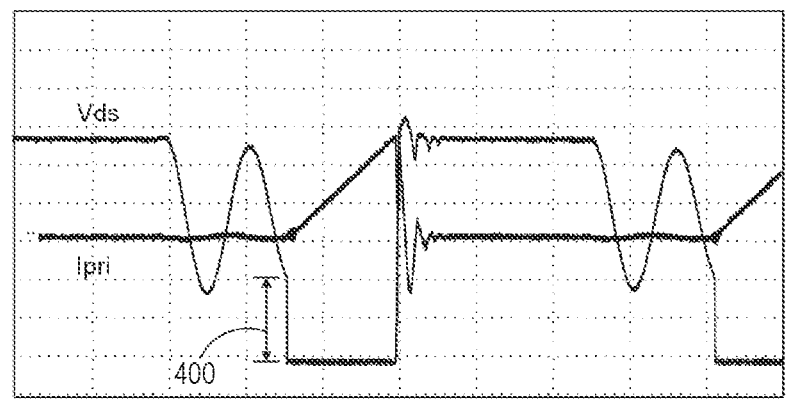
FIG. 5 is a timing diagram that illustrates voltage and current waveforms at various points for the flyback converter of FIG. 1 during an operational cycle according to another example.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 6:
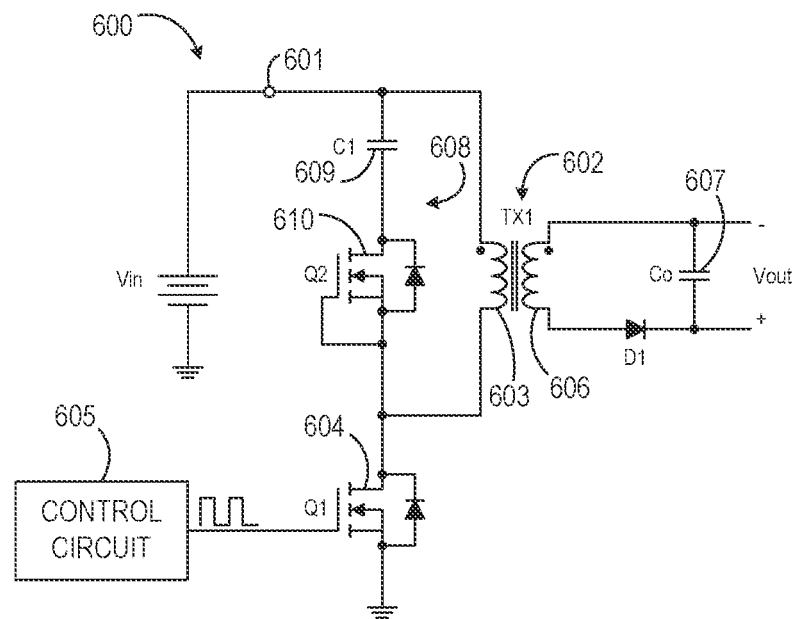
FIG. 6 is a schematic diagram of a DC/DC flyback voltage converter according to an embodiment of the invention.

A schematic diagram of a DC/DC voltage converter 600 that overcomes the aforementioned drawbacks is illustrated in FIG. 6. Voltage converter 600 has an input terminal 601 for enabling an input voltage Vin to be coupled with the voltage converter 600. The voltage converter 600 includes a transformer 602 with a primary winding 603 coupled with the input terminal 601 and a controllable switch 604. The switch 604 is typically a MOSFET having a control input (e.g., a gate terminal), a drain terminal, and a source terminal. A control circuit 605 is coupled to the control input for providing a control signal for controlling the timing of the on and off transition of the switch 604. The control circuit 605 typically includes a pulse width modulation circuit (PWM) generating a PWM signal for turning the switch 604 on and off. In operation, when the switch 604 is on, the inductor current in the primary winding 603 increases, storing energy in its magnetic field. When the transistor switch 604 is off, this energy is transferred via the secondary winding 606 of the transformer 602 to the output capacitor 607 and the load (not shown).

An improved snubber or clamp circuit 608 is coupled in parallel with the primary winding 603 of the transformer 602 and designed to lower the voltage Vds at the drain of MOSFET 604. The snubber circuit 608 includes a snubber capacitor 609 coupled in series with a snubber switch 610. According to embodiments, the snubber switch 610 is a super junction MOSFET having a nonlinear capacitance responsive to a magnitude of the drain-source voltage Vds across the FET 610. The main switch 604 may be a super junction FET or a non-super junction FET.

Figure 7:
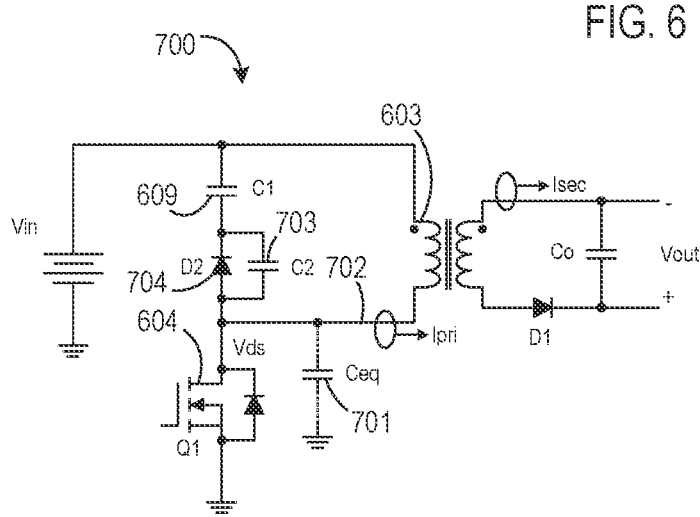
FIG. 7 is an equivalent schematic diagram of the flyback converter of FIG. 6.
Figure 8:
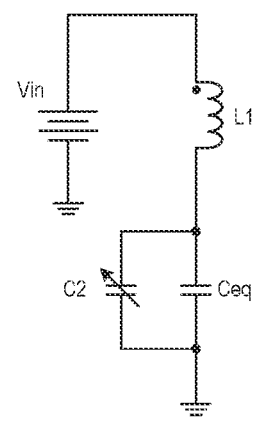
FIG. 8 is an equivalent schematic diagram during a portion of an operational cycle of the flyback converter of FIG. 6.
Figure 9:
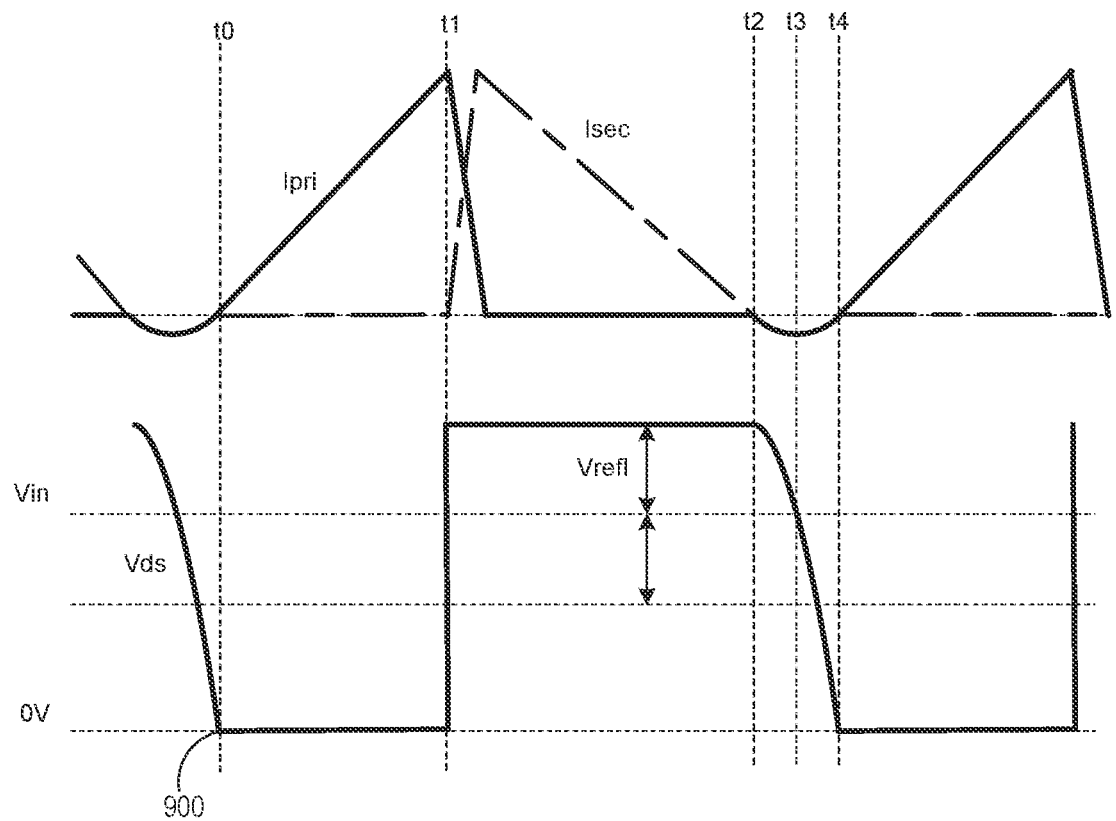
FIG. 9 is a timing diagram that illustrates voltage and current waveforms at various points for the flyback converter of FIG. 6 during an operational cycle according to an example.

Referring to FIGS. 7-9, equivalent circuits during periods t0-t2 (FIG. 7) and periods t2-t4 (FIG. 8) are illustrated for a timing diagram of periods t0-t4 (FIG. 9) for the voltage converter 600 of FIG. 6. The equivalent circuit 700 illustrated in FIG. 7 shows parasitic capacitances that include an equivalent capacitor (Ceq) 701 connected from a node 702 coupling the switch 604 to the primary winding 603. In addition, parasitic capacitance of the snubber switch 610 is indicated by a capacitor (C2) 703 shown in parallel with the body diode (D2) 704 of the snubber FET 610. Referring to FIG. 9, the switch 604 is turned on at the beginning of the time interval t0-t1. Accordingly, Vin is applied across the primary winding 603, and the primary current Ipri through the primary winding 603 linearly increases while the switch 604 is turned on. In addition, the snubber diode 610 is reverse biased. At t1, the switch 604 is turned off, and the energy stored in the current through the magnetizing inductance and leakage inductance push up the drain voltage Vds of the switch 604 and charge all the associated node capacitances until D1 and D2 become forward biased. C1 is large enough to capture the energy associated with the leakage inductance and control the peak voltage on the switch 604. The snubber resistor may be used to remove the charge from C1 each cycle unless the parasitic C2 is used. In response to the primary current Ipri reaching 0 A, the voltage on the primary is the reflected voltage of the secondary across the transformer per the primary-to-secondary turns ratio n. This reflected voltage is maintained until the secondary current Isec reaches 0 A and the transformer 602 is discharged at t2.

During periods t2-t4, the equivalent circuit 800 illustrated in FIG. 8 emphasizes the nonlinear capacitance (C2) of the super junction FET 610. The nonlinear capacitance of the super junction FET 604 acts against the magnetizing inductance to coerce the drain voltage of the main switch to or close to zero volts. In response to the transformer running out of energy (e.g., at the beginning of the voltage transition down on the drain of the switch 604), the snubber FET 610 starts with 0 Vds. Accordingly, its Coss capacitance is large and remains so until it develops a higher Vds voltage (e.g., ~40 Vds). Concurrently, the switch 604 is at high peak voltage and has a small associated Coss capacitance until its Vds falls below, for example, ~40 Vds. The Coss capacitance of the snubber FET 610 may be, for example, two orders of magnitude larger at 0V than at 40V. This larger capacitance of the snubber FET 610 maintains the snubber voltage across the magnetizing inductance longer, which ramps up the "reverse" current in the magnetizing inductance. This reverse magnetizing current builds up until the main switch 604 drain voltage Vds reduces to the input voltage. At this point, the snubber FET 610 has the snubber voltage across it, and the effective Coss is accordingly small. However, the built-up reverse magnetizing current is then reflective of the much larger Coss of the snubber FET 610 starting at 0 Vds, resulting in the primary magnetizing inductance 603 having the energy to swing the main switch node 702 much further than a natural resonance of a constant capacitance. This voltage swing is then slowed down as the main switch drain voltage Vds approaches zero volts due to the magnetizing current being reduced and the Coss of the switch 604 increasing significantly below 40V especially if the switch 604 is a super junction FET.

As illustrated in FIG. 6 and discussed above, the snubber switch 610 may be a controllable switch (e.g., a MOSFET) and more specifically, a super junction MOSFET. While the snubber switch 610 may be used in a controlled manner by controlling the gate-source voltage Vgs in some circuit usages and configurations, according to the embodiments disclosed herein, the snubber switch 610 is not controlled into on and off states. Instead, its gate is tied to a node (e.g., to the source node) such that it is kept in an off state (e.g., Vgs=0V). Thus, the snubber circuit 608 is not an actively-controlled circuit that results in a current flow through the FET that bypasses the body diode 704 in response to being controlled into a conductive mode. Accordingly, the nonlinear and non-constant capacitance of the super junction FET 610 is utilized to swing the drain voltage Vds of the switch 604 toward zero. In this manner, no control circuitry is required in the circuit design of the voltage converter 600 for switching the snubber switch 610 between its on and off states.

Referring to FIGS. 8 and 9, at t2, the drain of Q1 (e.g., switch 604) node capacitance is charged to Vin+Vrefl, which places Vrefl across the primary inductance L1 (e.g., primary winding 603). This node capacitance and the primary inductance L1 form a natural resonance LC tank. C2 is large and contributing significantly to the resonance. In one example, C2 is several orders of magnitude larger than Ceq until about 40V is developed across C2, resulting in the capacitance of C2 becoming very small again. This nonlinearity of C2 builds up magnetizing energy in the tank to the level of a large capacitor in the start of the cycle but then reduces several orders of magnitude as the voltage develops across it. As resonance continues, the built-up magnetic energy is able to swing the Ceq much farther than a linear resonant tank. Proper selection of the super junction FET 610 allows ZVS to occur without the need to control the on state of the clamp FET Q2. This resonance also removes charge from C1, eliminating the need for a bleed resistor. It is noted that at t2, the resonant tank has 0 A, no magnetic energy, and maximum voltage all electric field energy. At t3, the resonant tank has maximum magnetic energy and 0 electric field energy (VL1=0 effectively). At t4, the resonant tank has 0 A, no magnetic energy and maximum electric field energy. The point t4 is the point during quasi-resonant control that will turn on Q1 604, optimally at the minimum drain voltage to reduce switching loss. As illustrated in FIG. 9, the voltage swing caused by the snubber FET 610 reduces the Vds to or near 0V 900 to achieve ZVS.

Figure 10:
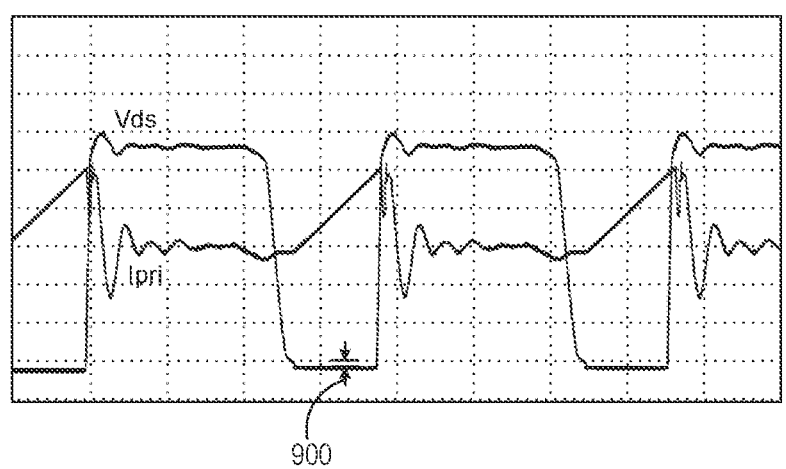
FIG. 10 is a timing diagram that illustrates voltage and current waveforms at various points for the flyback converter of FIG. 6 during an operational cycle according to another example.

FIG. 10 illustrates an example of a timing diagram showing the drain-source voltage of the switch 604 and the primary current waveform at various points for the flyback converter of FIG. 6 with switch turn-on occurring during the first valley (e.g., in a quasi-resonant control mode).

Figure 11:
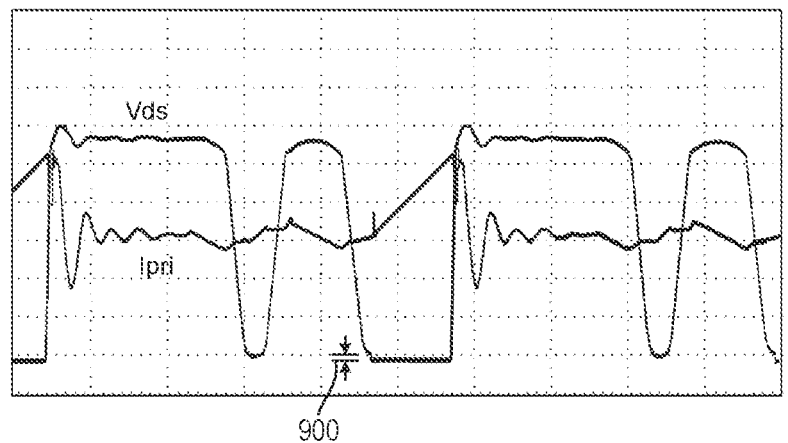
FIG. 11 illustrates waveforms of the flyback converter of FIG. 6 during an operational cycle according to another example.

FIG. 11 illustrates an example of a timing diagram showing the drain-source voltage of the switch 604 and the primary current waveform at various points for the flyback converter of FIG. 6 with switch turn-on occurring during the second valley. As shown, the drain voltage Vds experienced by the switch 604 at turn-on is low so that even at valleys during the ringing cycle subsequent to the first valley, damage to the switch 604 that would be caused by higher voltages is reduced or eliminated. Accordingly, ZVS on subsequent valley switching can be maintained. Additionally, the ZVS is maintained even if the output voltage is changed.

Figure 12:
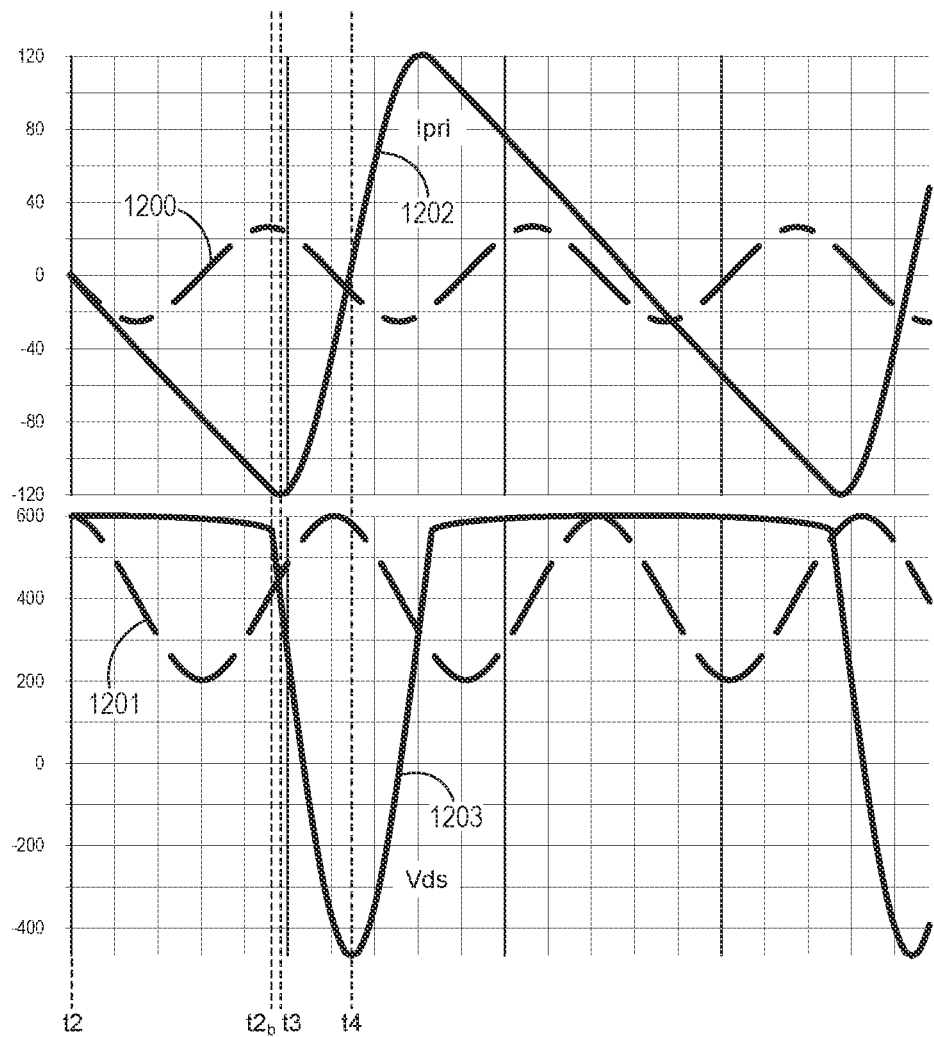
FIG. 12 illustrates a simulated overlay of a linear circuit resonant response from the circuit of FIG. 1 compared with the nonlinear circuit resonance response of the circuit of FIG. 6.

FIG. 12 illustrates a simulated overlay of a linear circuit resonant response from the circuit of FIG. 1 compared with the nonlinear circuit resonance response of the circuit of FIG. 6. The Ipri response 1200 and Vds response 1201 from the circuit of FIG. 1 are shown in dashed lines, and the Ipri response 1202 and Vds response 1203 from the circuit of FIG. 6 are shown in solid lines. The voltage 1200 of the linear circuit is only able to swing the capacitor voltage Vrefl about Vin. Thus, the minimum valley voltage that the linear circuit produces is Vin−Vrefl. However, the voltage 1202 of the nonlinear circuit is able to swing the voltage down to or near 0V.

Throughout the majority of t2, nearly all Vrefl is held across the magnetizing inductance, which builds up the magnetizing current to a level representative of a resonant tank with energy of a significantly larger Cres. At t2b, the effective resonant capacitance drops multiple orders of magnitude, so the built-up magnetizing energy is able to drive the capacitor voltage much farther than Vrefl. At t2, the inductor current is 0 A, and Vds=Vin+Vrefl. At t2b, the voltage across C2 reaches a capacitance threshold voltage (e.g., 25V) that drops the capacitance multiple orders of magnitude. At t3, the inductor current is at max, Vds=Vin, and the voltage across the inductance L1=0V. At t4, inductor current is 0 A, and tank energy is all capacitive.

Embodiments of this disclosure allow for the converter of FIG. 6 to have ZVS created from nonlinear capacitance. The leakage energy excursion of drain voltage of Q1 is effectively clamped, similar to known RCD circuits. However, the bleed resistor of the typical RCD circuit coupled in parallel with the capacitor C1 is not needed since the charge created from the capture of the leakage energy from the clamping capacitor is removed. Additionally, complicated control of an active FET to achieve ZVS and its associated circuitry is also avoided, and no isolated gate drive is, therefore, needed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A voltage converter comprising:
a voltage input;
a transformer comprising a primary winding coupled with the voltage input;
a main switch coupled at a node with the primary winding;
a snubber circuit coupled with the voltage input and with the node, the snubber circuit comprising a controllable switch having a gate and a source; and
a control circuit coupled with the main switch and configured to turn the main switch on and off to convert an input voltage supplied to the voltage input to an output voltage distinct from the input voltage;
wherein the gate is coupled with the source to prevent the controllable switch from turning on; and
wherein the voltage converter is a flyback voltage converter.

2. The voltage converter of claim 1, wherein the controllable switch comprises a super junction metal-oxide-semiconductor field-effect transistor (MOSFET).

3. The voltage converter of claim 2, wherein the main switch comprises a non-super junction MOSFET.

4. The voltage converter of claim 2, wherein the snubber circuit further comprises a capacitor coupled between the controllable switch and the voltage input.

5. The voltage converter of claim 4, wherein the snubber circuit is absent a bleed resistor coupled in parallel with the capacitor for removing a charge from the capacitor.

6. The voltage converter of claim 2, wherein the control circuit is configured to turn the main switch on near a minimum value of a valley of a ringing cycle to achieve zero-voltage switching (ZVS).

7. The voltage converter of claim 6, wherein the valley is a first ringing valley.

8. The voltage converter of claim 6, wherein the minimum value is zero volts.

9. The voltage converter of claim 8, wherein the transformer further comprises a secondary winding; and
wherein the voltage converter comprises:
a voltage output; and
a diode coupled between the secondary winding and a first terminal of the voltage output.

10. A method of manufacturing a voltage converter comprising:
coupling a transformer comprising a primary winding coupled with a voltage input;
coupling a main switch with the primary winding at a node;
coupling a snubber circuit with the voltage input and with the node, the snubber circuit comprising a controllable switch having a gate and a source; and
coupling a control circuit coupled with the main switch and configuring the voltage input to turn the main switch on and off to convert an input voltage supplied to the voltage input to an output voltage distinct from the input voltage;
wherein the gate is coupled with the source to prevent the controllable switch from turning on; and
wherein the voltage converter is a flyback voltage converter.

11. The method of claim 10, wherein the controllable switch comprises a super junction metal-oxide-semiconductor field-effect transistor (MOSFET).

12. The method of claim 11, wherein the main switch comprises a non-super junction MOSFET.

13. The method of claim 11, wherein the snubber circuit further comprises a capacitor coupled between the controllable switch and the voltage input.

14. The method of claim 13, wherein the snubber circuit is absent a bleed resistor coupled in parallel with the capacitor for removing a charge from the capacitor.

15. The method of claim 11 further comprising configuring the control circuit to turn the main switch on near a minimum value of a valley of a ringing cycle to achieve zero-voltage switching (ZVS).

16. The method of claim 15, wherein the valley is a first ringing valley.

17. The method of claim 15, wherein the minimum value is zero volts.

18. The method of claim 17, wherein the transformer further comprises a secondary winding; and
wherein the method further comprises coupling a diode coupled between the secondary winding and a first terminal of a voltage output.

* * * * *